(No Model.) 2 Sheets—Sheet 1.

E. A. SPERRY.
CONTROLLER FOR ELECTRIC OR OTHER MOTORS.

No. 525,394. Patented Sept. 4, 1894.

Witnesses.
L. P. Abell
A. H. Abell

Inventor.
Elmer A. Sperry.

(No Model.) 2 Sheets—Sheet 2.
E. A. SPERRY.
CONTROLLER FOR ELECTRIC OR OTHER MOTORS.

No. 525,394. Patented Sept. 4, 1894.

Witnesses.
L. P. Abell
A. H. Abell

Inventor.
Elmer A. Sperry

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

CONTROLLER FOR ELECTRIC OR OTHER MOTORS.

SPECIFICATION forming part of Letters Patent No. 525,394, dated September 4, 1894.

Application filed July 21, 1894. Serial No. 518,169. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Controllers for Electric or other Motors, of which the following is a specification.

My invention relates to a system of control for machinery, especially prime movers or motors, and consists in details of construction which may be used together with electric motors, particularly when operated in connection with motor-driven cars.

It also consists in suitable devices for applying the brake or using the motor to brake the car, and interlocking devices between operating handles which are designed to perform different functions in connection with the motor or operation of the connected mechanism, for instance the motor handle and the braking handle of motor-driven cars.

So-called motor men not being experts often apply the motive power to cars while the brake is yet active, and also attempt to apply the brake while the motor is still acting. The present invention is designed to obviate this by arrangement for dis-simultaneous operation so that one cannot be operated until the other is thrown off.

Figure 1:
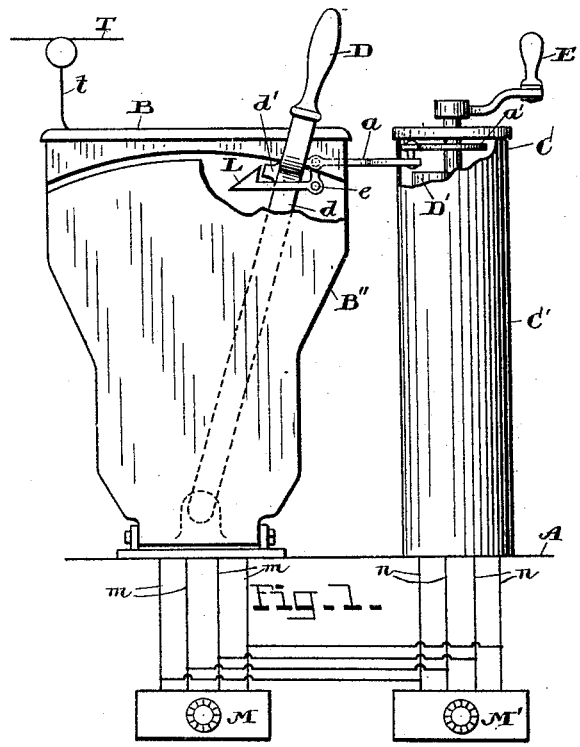
Figure 2:
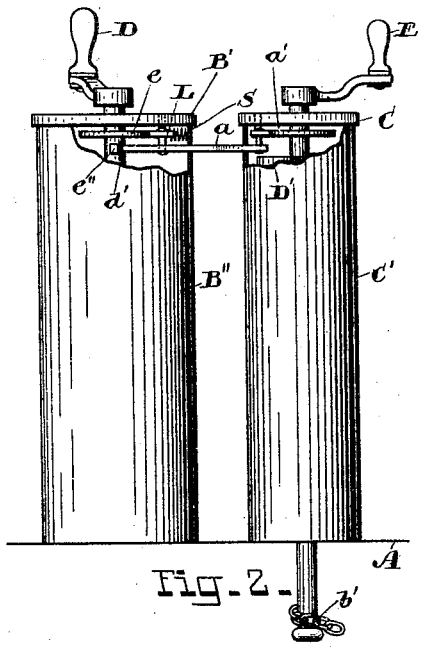
Figure 3:
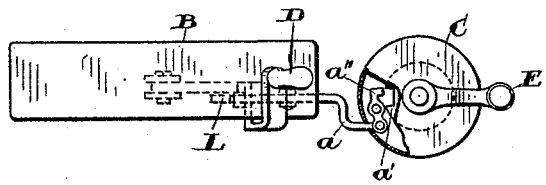
Figure 4:
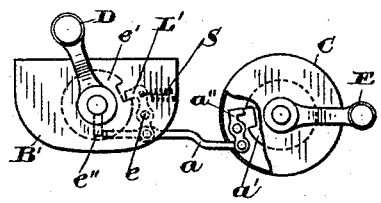
Figure 5:
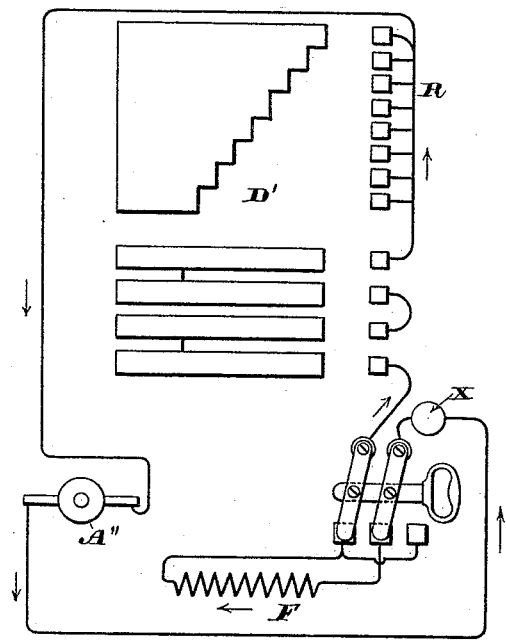
Figure 6:
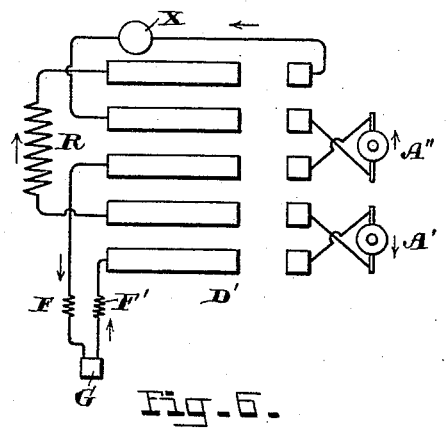

In the accompanying drawings, Figures 1 and 2 represent elevations, partially in section, of forms of the device and circuits in diagram. Figs. 3 and 4 are plan views of the same; Figs. 5 and 6 diagrammatic views of some of the connections when the electric brake is used in connection with the trailer.

Like letters of reference indicate similar parts throughout.

The line A indicates the floor of the platform of a car upon which are mounted the controllers B, B' and C. These are shown as having separate casings B'' and C' but they may obviously be all placed within a single case. Whichever method of construction is followed, however, there should be two handles.

The handles D are used normally to apply the power to the motor (or current if it be an electric motor) shown in Fig. 1 as having a swinging movement on the lever $d$ and in Fig. 2 as having a rotary movement about or with the spindle $d'$. Either of these handles D or E may have any of the well known movements by means of which their functions may be performed. For instance, the handle E may be attached to a lever similar to $d'$ and swing instead of rotate, or both of the handles may be fastened to slides and slide in grooves which are either rectilinear or curved, and, as will be readily understood, the invention extends to such constructions. In the figures the handles are shown in their positions of rest in which they may be locked. The locking, however, may occur at any predetermined position which may be known as the critical position of the handles.

The function of the handle E is essentially different from that of the handle D. For instance, it may wind up a brake chain $b'$ or may apply any power to operate the brakes; it may be used to signal for brakes, or perform functions which are necessary in connection with the motor, trailer, or power applier B or B', the former being shown in Fig. 1 to be connected with the trolley T by wire $t$ and also to the motors M M' by wires $m$ $m$, &c. The motors are also connected with the operating handle E by wires $n$ $n$, &c. The handles D and E in Fig. 1 therefore constitute switches for controlling the circuit relations of the motors M M' or either of them.

The essence of one part of the invention resides in the interlocking device by means of which the normal actuation or movement of one of the levers is caused to effect the movement of the other. This may be carried into practice by various methods, two of which are illustrated in the drawings, consisting in the connecting link $a$ which connects the controller or portion of the controller containing one handle with that containing the other. This lever co-operates with the notched disk $a'$ connected with the handle E either direct or through the pivoted dog $a''$.

The connecting link $a$ or the connected parts are preferably given a tendency in one direction, to the left in the drawings, by the spring S in Figs. 2 and 4, or by the gravity of the latch L in Figs. 1 and 3. The latch L' in Figs. 2 and 4 is shown working in a horizontal plane, and the latch L in Fig. 1 is illustrated as in a vertical plane, both operated by a pivot $e$. In Fig. 1 the latch L is shown as co-operating with the lever $d'$ and in Figs. 2 and 4 with the notched disk $e'$.

In the operation of the handle D an abutment is shown by means of which the connection is actuated when the handle D is thrown to or near some predetermined position, which may be one of its extreme positions. In Figs. 2 and 4 this stop is shown by the pin $e''$, and in Figs. 1 and 3 by the lever or handle itself, which in either instance simply abuts against the ends of the connecting links $a$.

In Fig. 5 electrical connections are shown for a drum or cylinder $D'$, the upper end of which may be seen in Figs. 1 and 2 within the casing $C'$ when the controller or the side of the controller indicated at C is used in connection with an electric motor. The connections here shown are of a closed circuit for the motor and the connections with its armature and field are reversed relatively to their use when operating the car from the trolley current, the principal features consisting in the fact, which may or may not always be present, that the circuit is local and closed: $A''$ being the armature, F the field, and R being the resistance by the cutting out of which the current generated by the transformed motor may be controlled. Electric brake magnets for further arresting the train, or other device operated in the local circuit, are indicated at X.

Fig. 6 shows a diagram of circuits, for instance on cylinder $D'$ when two motors are used, $A'$ and $A''$ being two armatures and F and $F'$ two fields. In this instance the means of manipulation of the resistance R is not illustrated and the circuit is not complete and local except through the ground G. The operated device X may be present as shown in the circuit. Here the current may pass one field in a direction similar to that taken when used as a motor, and pass the other field in the opposite direction, the advantages of which are well known.

The use and operation of the invention will be understood as follows: The positions in which the handles D are shown in the figures are some predetermined positions, where the motive power has been turned off the motor, or for instance the connection between the motor and the wheels or other driven mechanism has been severed. The tendency imparted by the spring S or by gravity as explained, compels the projection to fall into the slot of the disk $a'$ by means of which the handle E is locked from rotation. When however the handle D reaches the position last above mentioned it is made by the abutment of the handle or part $e''$ against the interlocking portions to overcome the gravity or spring action and release the handle E by withdrawing the projection from the notch in plate $a'$ being in the instance shown the nose of the dog $a''$ joined to the connecting link $a$. This may form the sole function of the interlocking parts, but I prefer to add the simultaneous operation of the latch L or $L'$ by means of which not only the handle E is released, but the handle D may be locked by the same movement. In addition to the above functions, two others of importance may be pointed out in the co-operation of the disks $e'$ with the latch $L'$ effectually preventing the unlocking or releasing of the handle E while the handle D is in any position except the critical position shown in the drawings. Whereas in Figs. 2 and 4 a similar function will be understood to be present in the co-operation of the dog $a''$ and the periphery of the disk $a'$. After the handle E is moved any attempt to move the handle D is effectually prevented from the fact that the dog $a''$ strikes on the periphery and will not allow the latches L and $L'$ to be removed until the handle E has first been turned to its critical position shown in the drawings with the notch in the disk opposite the face of the dog or the projection of the interlocking device co-operating in such notch, which predetermined position may be utilized as bearing some relation to the features and function of the controller C.

It will be understood that other devices may be employed, for instance, the latches and projections may be actuated by electro-magnets or by other mechanical means, such as gearing and the like, without departing from the spirit of the invention, and while it is designed to use all the above features in connection with each other, yet it is obvious that some may be used without the others, and the invention extends to such use.

Having described my invention, what I claim as new, and desire to secure by Letters Patent, is—

1. In combination with an electric machine or machines, an electric circuit, an operating handle, means connected with such operating handle for varying the electric conductivity of such circuit, another and separate operating handle, means also connected with it for varying the conductivity of an electric circuit, each handle having a zone or position known as its critical position, the arrangement being such that by manipulation of either handle to or from such critical position the conductivity is gradually increased or decreased, in combination with interlocking devices between the handles whereby either is locked when the other is out of said critical position.

2. The combination, with two or more controller operating handles, of interlocking devices consisting in an abutment and a latch connected with one handle, a latch for locking the other handle, and a connecting portion for dissimultaneous operation of the latches.

3. The combination, with two or more controller operating handles, of interlocking devices consisting in an abutment and a latch connected with one handle, a latch for locking the other handle, and a connector for the latches whereby one is thrown out of engagement while the other is being thrown into engagement.

4. The combination, with two or more controller operating handles having certain critical positions, of interlocking devices consisting in an abutment and a latch connected with one handle, a latch for locking the other handle, and a device connected with each handle for preventing the unlocking of the other when the said handle stands in any other than the said critical position.

5. The combination, with two or more controller operating handles having certain critical positions, of interlocking devices connecting them, a latch for locking each handle, connection between the latches for preventing unlocking of the other when the said handle stands in any other than the said critical position, and an additional device connected with one of the handles for actuating the lock while said handle is being moved into said critical position.

6. A motor controller handle of a car having a certain critical position, a separate brake handle, and means for locking the brake handle when the controller handle is in other than its said critical position.

7. A brake handle of a car having a certain critical position, a separate motor controller handle, and means for locking the latter when the brake handle is in other than its said critical position.

ELMER A. SPERRY.

Witnesses:
M. NIELSON,
F. WAYLAND BROWN.